United States Patent
Patwardhan et al.

(10) Patent No.: US 10,387,381 B1
(45) Date of Patent: Aug. 20, 2019

(54) DATA MANAGEMENT USING AN OPEN STANDARD FILE SYSTEM INTERFACE TO A STORAGE GATEWAY

(71) Applicant: EMC IP Holding Company LLC, Hopkinton, MA (US)

(72) Inventors: Kedar Patwardhan, Irvine, CA (US); Arash Sepasi Ahoei, Irvine, CA (US); Mathew Sprehn, Irvine, CA (US); Michael Smolenski, Sparks, NV (US); Devon Kemp, Laguna Hills, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 389 days.

(21) Appl. No.: 15/283,567

(22) Filed: Oct. 3, 2016

(51) Int. Cl.
*G06F 12/00* (2006.01)
*G06F 17/30* (2006.01)
*G06F 16/182* (2019.01)
*G06F 16/13* (2019.01)
*G06F 16/16* (2019.01)

(52) U.S. Cl.
CPC ............ *G06F 16/182* (2019.01); *G06F 16/13* (2019.01); *G06F 16/164* (2019.01)

(58) Field of Classification Search
CPC ...... G06F 16/182; G06F 16/164; G06F 16/13; G06F 11/2074; G06F 11/2094; G06F 11/2097; G06F 11/1464; G06F 11/1435; G06F 11/1451; G06F 11/1456; G06F 16/113; G06F 16/185
See application file for complete search history.

(56) References Cited

U.S. PATENT DOCUMENTS

2005/0267982 A1* 12/2005 Nakatani ........... G06F 17/30067
709/233
2015/0012571 A1* 1/2015 Powell ............. G06F 17/30235
707/827

* cited by examiner

*Primary Examiner* — Azam M Cheema
(74) *Attorney, Agent, or Firm* — Dergosits & Noah LLP; Todd A. Noah

(57) ABSTRACT

Data management using an open standard file system interface to a storage gateway is described. A system uses an open standard file system interface to instruct a storage gateway to create a directory, create a file for the directory, write information to the file, and store, based on the information written to the file, data to storage associated with the storage gateway.

20 Claims, 3 Drawing Sheets

DATA MANAGEMENT USING AN OPEN
STANDARD FILE SYSTEM INTERFACE TO
A STORAGE GATEWAY

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object. A backup/restore application may create a full backup file that includes all of a data object or the parts of the data object that are used. A backup/restore application may also create an incremental backup file that includes only changes made to the data object since a selected time, such as a previous backup of the data object.

A data object and/or a backup file may be stored on storage, which is a model of data storage in which digital data is stored in logical pools, with the physical storage spanning multiple servers, and often locations, and the physical environment typically owned and managed by a hosting company. For example, in a cloud storage environment, a cloud storage provider is responsible for keeping the stored data available and accessible, and the physical environment protected and running. People and organizations buy or lease storage capacity from a cloud storage provider to store user, organization, and/or application data. Cloud storage services may be accessed through a co-located cloud computer service, a web service application programming interface (API), or by applications that utilize a web service API, such as cloud desktop storage, a cloud storage gateway, or Web-based content management systems.

DETAILED DESCRIPTION

Figure 1:
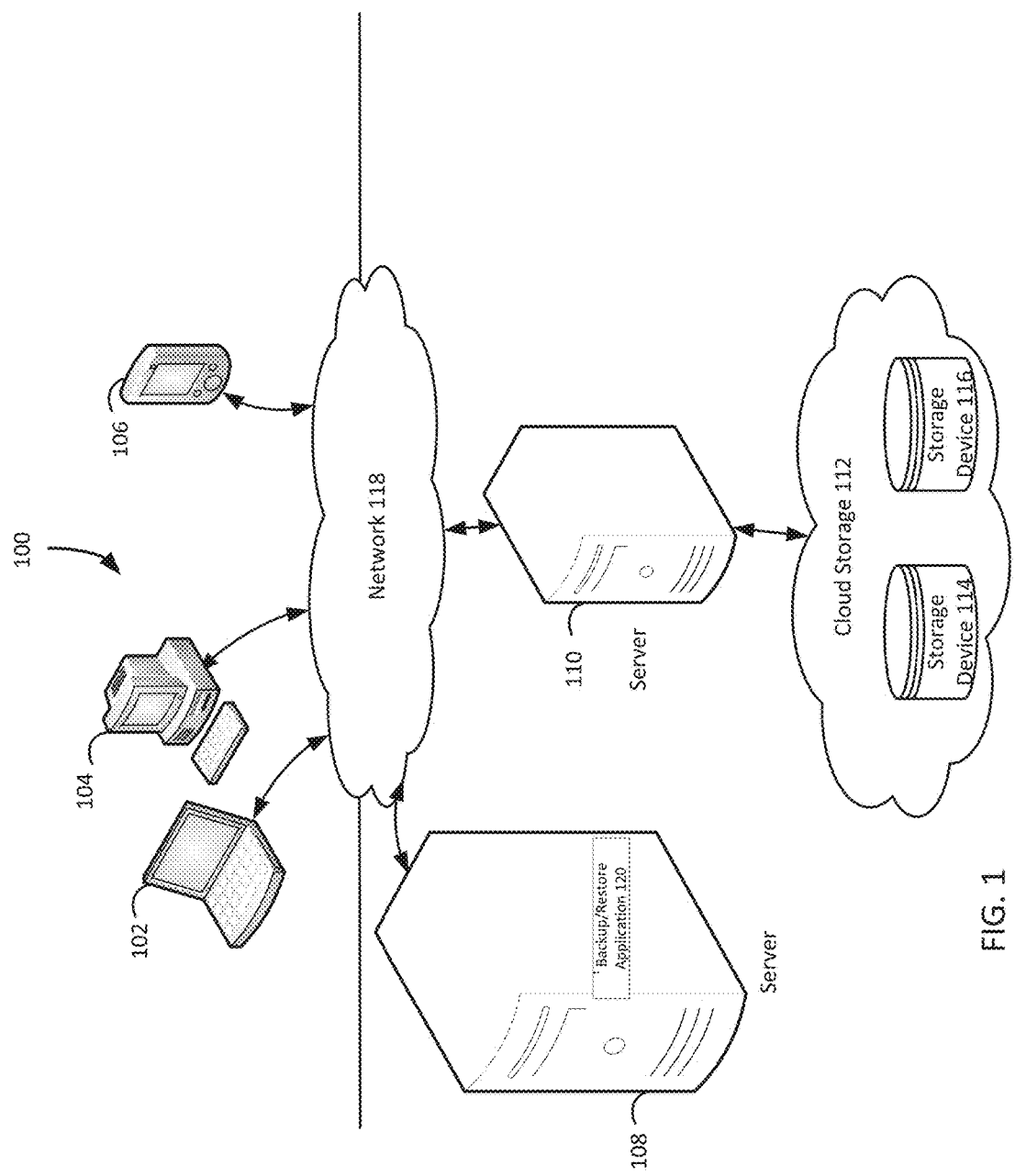
FIG. 1 illustrates a block diagram of an example system for data management using an open standard file system interface to a cloud storage gateway, under an embodiment.

While this disclosure uses backup files and a cloud storage gateway as examples, the procedures discussed apply to general data management operations and other storage gateways. A typical backup/restore application uses a proprietary interface to list backup files, store new backup files, delete backup files, or otherwise manage backup files. The interface for managing backup files is proprietary and does not follow any open standard. Thus customers need proprietary backup/restore applications, proprietary graphic user interfaces, and proprietary graphic user interface agents for managing their backup files. If a customer could carry out all backup file management tasks using a well-known interface that was not proprietary, it would be easy for customers to change backup/restore application vendors without affecting productivity.

In the most general case of storing backup files in cloud storage, a typical backup/restore application reads data on a client system, optionally de-duplicates/compresses the backup data, catalogues the backup data, and sends the backup data to a cloud storage gateway, which exposes a file system interface backed by the cloud storage. Any data written to the file system exposed by the cloud storage gateway ends up getting written to the cloud storage. Often the cloud storage gateway is an intelligent device (like Maginatics or SteelStore) and has built-in de-duplication/compression capabilities. The cloud storage gateway is often just the backend for storing backup files, and cannot intelligently link backup files into chains of backup files of a particular client, or group the backup files, implement any backup file management/retention policy, or catalogue the backup files. All of these tasks are implemented by a typical backup/restore application, which carries out these tasks by employing a combination of methods, which include storing special metadata for backup file management or implementing the backup file management function itself. Even if a cloud storage gateway were intelligent enough to carry out certain backup file management tasks itself, the cloud storage gateway would still need a proprietary interface with a typical backup/restore application to trigger those capabilities, thus tightly coupling the cloud storage gateway to the typical backup/restore application. Furthermore, since it is the typical backup/restore application that creates the backup file's metadata that is sent to the cloud storage gateway to manage backup files, the typical backup/restore application cannot be interpreted by the cloud storage gateway since the format of such metadata is proprietary to the typical backup/restore application. A typical backup/restore application either does not permit the creation of an intelligent cloud storage gateway that can perform a multitude of backup file management tasks itself, or requires the guidance or instructions from the typical backup/restore application using a proprietary interface between the typical backup/restore application and the cloud storage gateway. A typical backup/restore application does not allow a cloud storage gateway to perform the bulk of backup management and control functions itself without having a proprietary interface between the typical backup/restore application and the cloud storage gateway. If a typical backup/restore application wants to group together (link together) a full backup file of a client with other incremental backup files of the same client, it cannot do so using just the file system interface exposed by the cloud storage gateway. Any tight coupling between a typical backup/restore application and the cloud storage gateway prevents the cloud storage gateway from being agnostic towards other backup/restore applications.

Embodiments herein enable data management using an open standard file system interface to a cloud storage gateway. A system uses an open standard file system interface to instruct a cloud storage gateway to create a directory, create a file for the directory, write information to the file, and store, based on the information written to the file, data to cloud storage associated with the cloud storage gateway.

For example, a backup/restore application uses a Network File System (NFS) command to instruct a cloud storage gateway to create a specially named directory that includes the client name backup_group1 and the backup file name backup_id1. Then the backup/restore application uses a Network File System command to instruct the cloud storage gateway to create a specially named file in the directory, the file name including the client name backup_group1 and the backup file name backup_id1. Next, the backup/restore application uses a Network File System command to instruct the cloud storage gateway to write metadata to the specially named file. The metadata specifies that the backup file about to be stored is an incremental backup file, the previous backup file for the same client was the backup file named backup_id0, and that the cloud storage gateway is about to be creating a virtual synthetic full image of the client backup_group1 by merging the backup file about to be stored with the previous backup file. Finally, the backup/restore application uses a Network File System command to instruct the cloud storage gateway to store the backup file named backup_id1 to cloud storage based on the metadata. Without the use of a proprietary interface, this store command results in the cloud storage gateway merging the backup file backup_id1 with the previous backup file backup_id0 to create the virtual synthetic full image of the client backup_group1. In contrast, while a typical backup/restore application could use an open standard file system interface to instruct a cloud storage gateway to create a directory, create a file in the directory, and write information to the file, the cloud storage gateway could not use this written information to determine how subsequent data is stored.

FIG. 1 illustrates a diagram of a system for data management using an open standard file system interface to a cloud storage gateway, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users. Therefore, while the system and methods described herein are directed to an embodiment for data management using an open standard file system interface to a cloud storage gateway, the methods apply equally to data management using an open standard file system interface to other storage gateways known to those skilled in the art.

In an embodiment, the system 100 represents a cloud computing system that includes a first client 102, a second client 104, and a third client 106; and a first server 108, a second server 110, and cloud storage 112 that may be provided by a hosting company. Although FIG. 1 depicts the first client 102 as a laptop computer 102, the second client 104 as a personal computer 104, and the third client 106 as a personal digital assistant 106, each of the clients 102-106 may be any type of computer, such as a server. The cloud storage 112 includes a first storage device 114 and a second storage device 116. The clients 102-106 and the servers 108-110 communicate via a network 118. Although FIG. 1 depicts the system 100 with three clients 102-106, two servers 108-110, one cloud storage 112, two storage devices 114-116, and one network 118, the system 100 may include any number of clients 102-106, any number of servers 108-110, any number of cloud storages 112, any number of storage devices 114-116, and any number of networks 118. The clients 102-106 and the servers 108-110 may each be substantially similar to the system 300 depicted in FIG. 3 and described below.

The first server 108, which may be referred to as a backup server 108, includes a backup/restore application 120 that creates backup files of the data and the metadata of the clients 102-106, stores the backup files as backup files on the first storage device 114 and/or the second storage device 116, and executes a rollback based on the backup files. The backup/restore application 120 may provide centralized administration, such as scheduling, monitoring, and managing backup operations and backup files. The backup/restore application 120 can enable the storing of backup operation schedules, client policies, and client configurations. The backup/restore application 120 maintains a local database of all processes that execute on the backup server 108. The backup/restore application 120 executes server-side processes for a system administrator's graphical management console, which may enable the system administrator to use command line interface tools for queries. For example, a system administrator identifies the clients 102-106 registered with the backup server 108.

Although FIG. 1 depicts the backup/restore application 120 residing completely on the backup server 108, the backup/restore application 120 may reside in any combination of partially on the backup server 108, partially on the clients 102-106, and/or partially elsewhere. Even though the following paragraphs describe EMC Corporation's Avamar® backup/restore application and EMC Corporation's NetWorker® backup/restore application as examples of the backup/restore application 120, the backup/restore application 120 may be any other backup/restore application which provides the backup/restore functionalities described in the Background section.

The backup/restore application 120 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 120 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The second server 110, which may be referred to as a cloud storage gateway 110, can be a network appliance or server which resides at a customer's premises, and can translate cloud storage application programming interfaces to block-based storage protocols. Examples of cloud storage application programming interfaces include Simple Object Access Protocol (SOAP) and Representational State Transfer (REST). Examples of block-based storage protocols include Internet Small Computer System Interface (iSCSI), Fibre Channel, and file-based interfaces such as Network File System (NFS) and Server Message Block (SMB), one version of which is also known as Common Internet File System (CIFS). A file system interface can be an API (application programming interface) through which a utility or user program requests the storing and retrieving of data. An open standard architecture can be considered non-proprietary in the sense that the architecture is either unowned or owned by a collective body, such that the architecture can still be publicly shared and not tightly guarded. An open standard file system is a non-proprietary API through which a utility or user program requests the storing and retrieving of data. Unlike the cloud storage services which it complements, the cloud storage gateway 110 uses standard network protocols which integrate with existing applications. The cloud storage gateway 110 can also serve as an intermediary to multiple cloud storage providers.

First, an open standard file system interface is used to instruct a cloud storage gateway to create a directory. For example and without limitation, this can include the backup/restore application 120 using a Network File System command to instruct the cloud storage gateway 110 to create a specially named directory that includes a special name prefix followed by a special extension. For this example, the NFS command backup_group1::backup_id1::backupcontrol::namespace_operation_create:: creates a specially named directory that includes the client name backup_group1 as the special name prefix and includes the backup file name backup_id1 as the special extension following the special name prefix. Although examples describe the backup/restore application 120 using a Network File System command to instruct the cloud storage gateway 110, the backup/restore application 120 can use any open standard file system command to instruct the cloud storage gateway 110, such as a Server Message Block (SMB) command or a Common Internet File System (CIFS) command. By appending the special name prefix to the beginning of an open standard file system command, the backup/restore application 120 enables the cloud storage gateway 110 to differentiate between such an open standard file system command for data management and the typical open standard file system commands. By following the special name prefix with a special extension in an open standard file system command, the backup/restore application 120 enables the cloud storage gateway 110 to identify a backup file name in such an open standard file system command for data management.

When the backup/restore application 120 instructs the cloud storage gateway 110 to create the specially named directory, the cloud storage gateway 110 is informed that the backup/restore application 120 is about to begin storing a backup file belonging to the client named backup_group1, and that the first backup file will be named backup_id1. Therefore, the cloud storage gateway 110 extracts the name of the client being backed up and the name of the backup file from the specially named directory. The cloud storage gateway 110 further understands that all files stored by the backup/restore application 120 to the specially named directory belong to the client named backup_group1. The cloud storage gateway 110 does not create the specially named directory in the cloud storage 112, but uses the namespace created by the specially named directory to isolate backup files that are being created concurrently. In order to provide verification, an open standard file system interface can be used to instruct a cloud storage gateway to read a parameter associated with a directory. For example, the backup/restore application 120 uses a Network File System command to instruct the cloud storage gateway 110 to read a parameter created by the cloud storage gateway 110 in response to the request to create the specially named directory. Then the backup/restore application 120 verifies that the parameter confirms that the specially named directory was created as expected. If the backup/restore application 120 tried to create a specially named directory with a directory name that already existed in the cloud storage 112, then the cloud storage gateway 110 sets a parameter for the create directory request to indicate that the creation of the specially named directory failed. A directory can be a file system cataloging structure which contains references to other computer files, and possibly other directories. Creating a directory can be bringing the directory into existence. A parameter can be a special kind of variable, used in a subroutine to refer to at least one of the pieces of data provided as input to the subroutine.

After creating a directory, an open standard file system interface is used to instruct a cloud storage gateway to create a file for the directory. By way of example and without limitation, this can include the backup/restore application 120 using a Network File System command to instruct the cloud storage gateway 110 to create a specially named file, which includes a special name prefix followed by a special extension, in the specially named directory. For this example, the NFS command backup_group1::backup_id1::backupcontrol::namespace_operation_config:: creates a specially named file, which includes the client name backup_group1 as the special name prefix and includes the backup file name backup_id1 as the special extension following the special name prefix, in the specially named directory. When the backup/restore application 120 instructs the cloud storage gateway 110 to create the specially named file in the specially named directory, the cloud storage gateway 110 is informed that the backup/restore application 120 is about to begin storing metadata for the first backup file that will be named backup_id1 and begin storing the first backup file itself. Therefore, the cloud storage gateway 110 extracts the name of the client being backed up and the name of the backup file from the specially named file. The cloud storage gateway 110 further understands that all files stored by the backup/restore application 120 to the specially named directory belong to the client named backup_group1. The cloud storage gateway 110 does not create the specially named file in the cloud storage 112, but uses the namespace created by the specially named file to isolate backup files that are being created concurrently. In order to provide verification, an open standard file system interface can be used to instruct a cloud storage gateway to read a parameter associated with a file. For example, the backup/restore application 120 uses a Network File System command to instruct the cloud storage gateway 110 to read a parameter created by the cloud storage gateway 110 in response to the request to create the specially named file. Then the backup/restore application 120 verifies that the parameter confirms that the specially named file was created as expected. If the backup/restore application 120 tried to create a specially named file with a file name that already existed in the cloud storage 112, then the cloud storage gateway 110 sets a parameter for the create file request to indicate that the creation of the specially named file failed. A file can be a resource for storing information, which is available to a computer program and is usually based on some kind of durable storage. Creating a file can be bringing the file into existence.

Having created a file in a directory, an open standard file system interface is used to instruct a cloud storage gateway to write information to the file. In embodiments, this can include the backup/restore application 120 using a Network File System command to instruct the cloud storage gateway 110 to write metadata to the specially named file. The metadata specifies that the backup file about to be stored is an incremental backup file, the previous backup file for the same client was the backup file named backup_id0, and that the cloud storage gateway 110 is about to be creating a virtual synthetic full image of the client backup_group1 by merging the backup file about to be stored with the previous backup file. The metadata can also specify that the cloud storage gateway 110 should use fixed-size block chunking when storing the backup file about to be stored in the cloud storage 112, that the cloud storage gateway 110 should use a content indexer to index the backup file about to be stored in the cloud storage 112, and that the cloud storage gateway 110 should delete the backup file about to be stored by a specified expiration date. Information can be a set of values of qualitative or quantitative variables. Writing can be the recording of signs and/or symbols. An example listing of the contents of the specially named file is listed as follows:
<backup group><backup_group1>< >
<backup_tag><backup_id1>< >
<backup_expiry><01/01/2020>< >
<previous_backup><backup_id0>< >
<chunking_type><fixed>< >
<chunking_size><64k>< >
<backup_datatype><VM Image backup>< >
<backup_type><incremental backup>< >
<End of file>

The cloud storage gateway 110 reads the specially named file and interprets its contents. Based on the example content listed above, the cloud storage gateway 110 understands that the backup/restore application 120 is about to store an incremental VM image backup file for a client named backup_group1, and that the previous backup of the same client was named backup_id0. The cloud storage gateway 110 further understands that the backup file about to be stored for the backup/restore application 120 will be chunked with a 64 KB chunking size and that the cloud storage gateway 110 will be creating a virtual synthetic full image of the client by merging the backup file about to be stored for the backup/restore application 120 with the already existing backup file backup_id0 for the same client backup_group1. The cloud storage gateway 110 will automatically expire or remove the backup file from the cloud storage 112 on Jan. 1, 2020, as instructed by the backup/restore application 120. Reading can be retrieving data from a storage device.

To facilitate reverse communication with the backup/restore application 120, the cloud storage gateway 110 responds to the special-file write request by interpreting the various control parameters passed by the backup/restore application 120 and substituting certain fields within the file with responses. An example of a possible response from the cloud storage gateway 110 is listed as follows:
<backup group><backup_group1><OK>
<backup_tag><backup_id1><ALREADY EXISTS>
<backup_expiry><01/01/2020><OK>
<previous_backup><backup_id0><OK>
<chunking_type><fixed><OK>
<chunking_size><64k><OK>
<backup_datatype><VM Image backup><OK>
<backup_type><incremental backup><OK>
<End of file>

Based on the example responses listed above, the backup/restore application 120 created a specially named file and wrote metadata about the backup file to be stored in the cloud storage 112. After writing the metadata to this specially named file, the backup/restore application 120 reads the specially named file and identifies the responses from the cloud storage gateway 110, which specify that the requested name backup_id1 for the backup file already existed in the cloud storage 112.

Providing verification, an open standard file system interface can be used to instruct a cloud storage gateway to read a parameter associated with information, a file, and/or a directory. For example and without limitation, this can include the backup/restore application 120 using a Network File System command to instruct the cloud storage gateway 110 to read the parameters written by cloud storage gateway 110 in response to the command to write the metadata. Then the backup/restore application 120 confirms whether the metadata was written as expected to the specially named file.

Once information is written to a file, and possibly verified, an open standard file system interface is used to instruct a cloud storage gateway to store, based on the information written to the file, data to cloud storage associated with the cloud storage gateway. By way of example and without limitation, this can include the backup/restore application 120 using a Network File System command to instruct the cloud storage gateway 110 to write the backup file named backup_id1 to a specially named file in the specially named directory, with the storing of the backup file in the cloud storage 112 being based on the metadata written to a specially named file. In this example, the write command results in the cloud storage gateway 110 merging the backup file backup_id1 with the previous backup file backup_id0 to create the virtual synthetic full image of the client backup_group1, which is stored in the cloud storage 112. In contrast, while a typical backup/restore application could use an open standard file system interface to instruct the cloud storage gateway 110 to create a directory, create a file in the directory, and write information to the file, the cloud storage gateway 110 could not use this written information to determine how subsequent data is stored. Storing the data to the cloud storage 112 may include storing at least some of the information written to the file with the data. For example, the cloud storage gateway 110 writes the expiration date metadata with the backup file when storing the backup file to the cloud storage 112. Data can be a set of values of qualitative or quantitative variables. Storing can be the recording of signs and/or symbols. In order to provide verification, an open standard file system interface can be used to instruct a cloud storage gateway to read a parameter associated with a file. For example, the backup/restore application 120 uses a Network File System command to instruct the cloud storage gateway 110 to read a parameter created by the cloud storage gateway 110 in response to the request to write the backup file named backup_id1 to a specially named file in the specially named directory, and the store the backup file in the cloud storage 112 based on the metadata written to a specially named file. Then the backup/restore application 120 verifies that the parameter confirms that the backup file was written and stored as expected. If the backup/restore application 120 failed to write backup data to a specially named file or store the backup file in the cloud storage 112, then the cloud storage gateway 110 sets a parameter for the write/store file request to indicate that the writing or storing of the backup file failed.

No longer needing a file, an open standard file system interface can be used to instruct a cloud storage gateway to remove the file. In embodiments, this can include the backup/restore application 120 using a Network File System command to instruct the cloud storage gateway 110 to unlink the specially named file that includes the client name backup_group1 and the backup file name backup_id1. Removing a file can be unlinking, deleting, or eliminating the file. Since a directory is not needed any longer, an open standard file system interface can be used to instruct a cloud storage gateway to remove the directory. For example and without limitation, this can include the backup/restore application 120 using a Network File System command to instruct the cloud storage gateway 110 to unlink the specially named directory that includes the client name backup_group1 and the backup file name backup_id1, which indicates to the cloud storage gateway 110 that the backup/restore application 120 is done sending backup files and/or metadata. Removing a directory can be unlinking, deleting, or eliminating the directory. The cloud storage gateway 110 may flush all transient backup data (or locally cached backup data within the cloud storage gateway 110) to the cloud storage 112 before allowing the unlink operation to complete on the specially created directory, thereby letting the backup/restore application 120 have control over the cloud storage consistency of the backup file stored in the cloud storage 112.

When data needs to be retrieved and the data was stored via a directory, an open standard file system interface can be used to instruct a cloud storage gateway to re-create the directory. By way of example and without limitation, this can include the backup/restore application 120 using a Network File System command to instruct the cloud storage gateway 110 to re-create the specially named directory that included the special name prefix followed by the special extension. For this example, the NFS command:
 backup_group1::backup_id1::backupcontrol::namespace_operation_restore::
re-creates the specially named directory that included the client name backup_group1 as the special name prefix and included the backup file name backup_id1 as the special extension following the special name prefix. When the backup/restore application 120 instructs the cloud storage gateway 110 to re-create the specially named directory, the cloud storage gateway 110 is informed that the backup/restore application 120 is about to begin restoring the first backup file named backup_id1 for the client named backup_group1. Therefore, the cloud storage gateway 110 extracts the name of the client backed up and the name of the backup file from the specially named directory.

The cloud storage gateway 110 further understands that all files restored by the backup/restore application 120 from the specially named directory belong to the client named backup_group1. The cloud storage gateway 110 does not re-create the specially named directory in the cloud storage 112, but uses the namespace created by the specially named directory to isolate backup files that are being restored concurrently. In order to provide verification, an open standard file system interface can be used to instruct a cloud storage gateway to read a parameter associated with a directory. For example, the backup/restore application 120 uses a Network File System command to instruct the cloud storage gateway 110 to read a parameter created by the cloud storage gateway 110 in response to the request to re-create the specially named directory. Then the backup/restore application 120 verifies that the parameter confirms that the specially named directory had been previously created. If the backup/restore application 120 tried to re-create a specially named directory with a directory name that did not already exist in the cloud storage 112, then the cloud storage gateway 110 sets a parameter for the create directory request to indicate that the re-creation of the specially named directory failed.

In all examples, the backup/restore application 120 creating these special named files and/or directories verifies that the specially named file and/or directory was created successfully. For specially named files, the backup/restore application 120 reads back the data from the specially named file to verify that the exact desired operation was valid. In the event that a specially named directory or file failed to be created, the error code itself may not be enough to indicate why the failure occurred. For example, in the event of attempting to restore a backup file from the cloud storage 112, the specially named directory:
 backup_group1::backup_id1::backupcontrol::namespace_operation_restore::
could have failed to have been created because of any of a number of reasons. Such reasons may include that the backup group did not exist, the backup file identifier did not exist, the backup file is not currently available for restore due to the cloud storage being temporarily unavailable, or an internal error occurred in the cloud storage gateway 110. Thus, when the specially named file or directory fails to be created, the backup/restore application 120 attempts to read back the specially named file or directory. Even if a specially named file or directory failed to be created, a file may exist that includes contents that provide useful, descriptive error messages about why the operation failed.

Alternatively, when data needs to be retrieved and the data was stored via a directory, an open standard file system interface can be used to instruct a cloud storage gateway to open the directory. In embodiments, this can include the backup/restore application 120 using a Network File System command to instruct the cloud storage gateway 110 to open the specially named directory that included the client name backup_group1 as the special name prefix and included the backup file name backup_id1 as the special extension following the special name prefix. Opening a directory can be exposing, allowing access, or enabling a view of a directory.

With access available to a directory that was used to store data, an open standard file system interface can be used to instruct a cloud storage gateway to retrieve the data from cloud storage. For example and without limitation, this can include the backup/restore application 120 using a Network File System command to instruct the cloud storage gateway 110 to retrieve the backup file named backup_id1 from the cloud storage 112. Either the re-create directory command or the open directory command requests the cloud storage gateway 110 to load the backup file's catalog into a specially named file, which the backup/restore application 120 enables the client to read. Then the client can use the backup/restore application 120 to read the backup files to be restored and/or perform a full restoration. Continuing the example, the retrieve command results in the cloud storage gateway 110 retrieving the virtual synthetic full image of the client backup_group1 that was previously created by merging the backup file backup_id1 with the previous backup file backup_id0. The backup/restore application 120 uses an open standard file system interface to manage data without requiring any vendor lock-in Retrieving data can be getting data or bringing back previously stored data.

Figure 2:
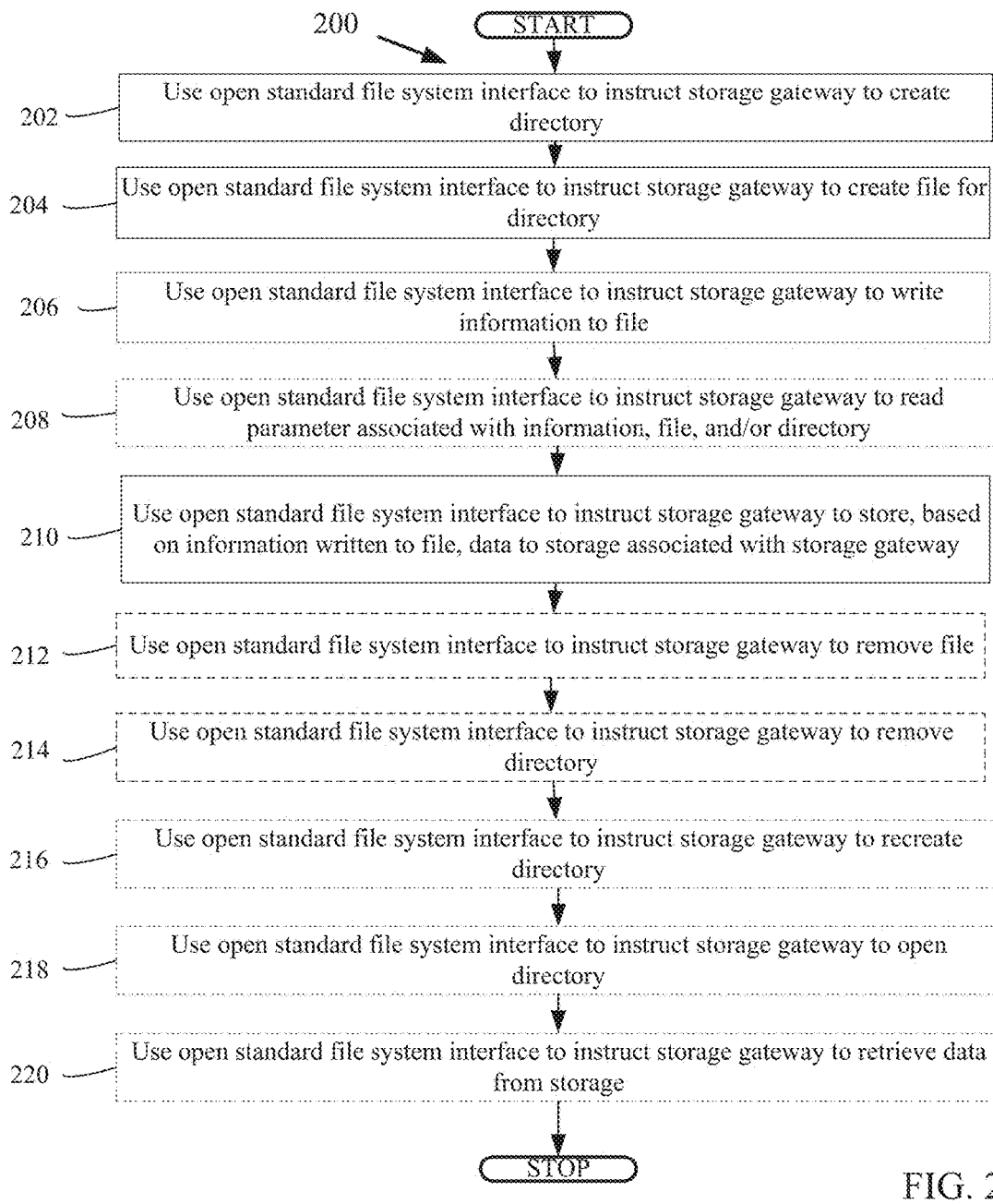
FIG. 2 is a flowchart that illustrates a method of data management using an open standard file system interface to a cloud storage gateway, under an embodiment.

FIG. 2 is a flowchart that illustrates a method for data management using an open standard file system interface to a cloud storage gateway, under an embodiment. Flowchart 200 illustrates method acts illustrated as flowchart blocks for certain steps involved in and/or between the clients 102-106 and/or the servers 108-110 of FIG. 1.

First, an open standard file system interface is used to instruct a cloud storage gateway to create a directory, block 202. For example and without limitation, this can include the backup/restore application 120 using a Network File System command to instruct the cloud storage gateway 110 to create a specially named directory that includes the client name backup_group1 and the backup file name backup_id1.

After creating a directory, an open standard file system interface is used to instruct a cloud storage gateway to create a file for the directory, block 204. By way of example and without limitation, this can include the backup/restore application 120 using a Network File System command to instruct the cloud storage gateway 110 to create a specially named file in the specially named directory, the file name including the client name backup_group1 and the backup file name backup_id1.

Having created a file in a directory, an open standard file system interface is used to instruct a cloud storage gateway to write information to the file, block 206. In embodiments, this can include the backup/restore application 120 using a Network File System command to instruct the cloud storage gateway 110 to write metadata to the specially named file. The metadata specifies that the backup file about to be stored is an incremental backup file, the previous backup file for the same client was the backup file named backup_id0, and that the cloud storage gateway 110 is about to be creating a virtual synthetic full image of the client backup_group1 by merging the backup file about to be stored with the previous backup file.

Providing verification, an open standard file system interface is optionally used to instruct a cloud storage gateway to read a parameter associated with information, a file, and/or a directory, block 208. For example and without limitation, this can include the backup/restore application 120 using a Network File System command to instruct the cloud storage gateway 110 to read parameters for the metadata from the specially named file. Then the backup/restore application 120 verifies that the parameters written by cloud storage gateway 110 in response to the command to write the metadata confirms that the metadata was written as expected to the specially named file.

Once information is written to a file, and possibly verified, an open standard file system interface is used to instruct a cloud storage gateway to store, based on the information written to the file, data to cloud storage associated with the cloud storage gateway, block 210. By way of example and without limitation, this can include the backup/restore application 120 using a Network File System command to instruct the cloud storage gateway 110 to store the backup file named backup_id1 to the cloud storage 112 based on the metadata. Without the use of a proprietary interface, this store command results in the cloud storage gateway 110 merging the backup file backup_id1 with the previous backup file backup_id0 to create the virtual synthetic full image of the client backup_group1.

No longer needing a file, an open standard file system interface is optionally used to instruct a cloud storage gateway to remove the file, block 212. In embodiments, this can include the backup/restore application 120 using a Network File System command to instruct the cloud storage gateway 110 to unlink the specially named file that includes the client name backup_group1 and the backup file name backup_id1.

Since a directory is not needed any longer, an open standard file system interface is optionally used to instruct a cloud storage gateway to remove the directory, block 214. For example and without limitation, this can include the backup/restore application 120 using a Network File System command to instruct the cloud storage gateway 110 to unlink the specially named directory that includes the client name backup_group1 and the backup file name backup_id1.

When data needs to be retrieved and the data was stored via a directory, an open standard file system interface is optionally used to instruct a cloud storage gateway to recreate the directory, block 216. By way of example and without limitation, this can include the backup/restore application 120 using a Network File System command to instruct the cloud storage gateway 110 to recreate the specially named directory that included the client name backup_group1 and the backup file name backup_id1.

Alternatively, when data needs to be retrieved and the data was stored via a directory, an open standard file system interface is optionally used to instruct a cloud storage gateway to open the directory, block 218. In embodiments, this can include the backup/restore application 120 using a Network File System command to instruct the cloud storage gateway 110 to open the specially named directory that included the client name backup_group1 and the backup file name backup_id1.

With access available to a directory that was used to store data, an open standard file system interface is optionally used to instruct a cloud storage gateway to retrieve the data from cloud storage, block 220. For example and without limitation, this can include the backup/restore application 120 using a Network File System command to instruct the cloud storage gateway 110 to retrieve the backup file named backup_id1 from the cloud storage 112. This retrieve command results in the cloud storage gateway 110 retrieving the virtual synthetic full image of the client backup_group1 that was previously created by merging the backup file backup_id1 with the previous backup file backup_id0.

Although FIG. 2 depicts the blocks 202-220 occurring in a specific order, the blocks 202-220 may occur in another order. In other implementations, each of the blocks 202-220 may also be executed in combination with other blocks and/or some blocks may be divided into a different set of blocks.

Figure 3:
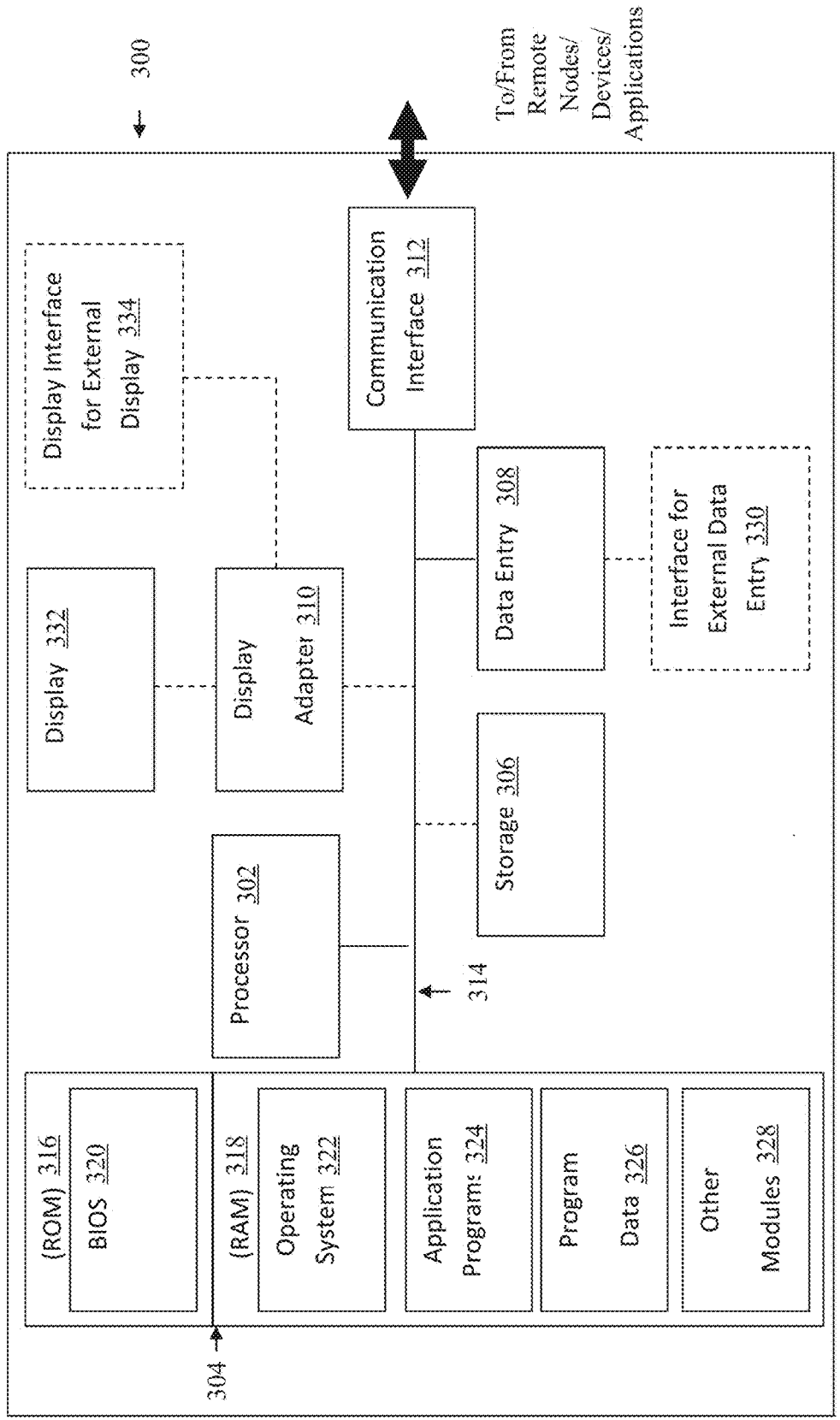
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
a processor-based application, which when executed on a computer, will cause the processor to:
use an open standard file system interface to instruct a storage gateway to create a directory having a directory name that includes a backup file name;
use the open standard file system interface to instruct the storage gateway to create a file for the directory, the file having a file name that includes the backup file name;
use the open standard file system interface to instruct the storage gateway to write information to the file, the information specifying how to store a backup file associated with the backup file name to cloud storage; and
use the open standard file system interface to instruct the storage gateway to store, based on the information written to the file, the backup file to cloud storage associated with the storage gateway.

2. The system of claim 1, wherein the processor-based application further causes the processor to use the open standard file system interface to instruct the storage gateway to read a parameter associated with at least one of the information, the file, and the directory.

3. The system of claim 1, wherein instructing the storage gateway to store the backup file to the cloud storage comprises instructing the storage gateway to merge the backup file with another file in the directory.

4. The system of claim 1, wherein storing the backup file to the cloud storage comprises storing at least some of the information written to the file with the backup file.

5. The system of claim 1, wherein the processor-based application further causes the processor to:
use the open standard file system interface to instruct the storage gateway to remove the file; and
use the open standard file system interface to instruct the storage gateway to remove the directory.

6. The system of claim 1, wherein the processor-based application further causes the processor to:
use the open standard file system interface to instruct the storage gateway to recreate the directory; and
use the open standard file system interface to instruct the storage gateway to retrieve the data from the cloud storage.

7. The system of claim 1, wherein the processor-based application further causes the processor to:
use the open standard file system interface to instruct the storage gateway to open the directory; and
use the open standard file system interface to instruct the storage gateway to retrieve the data from the cloud storage.

8. A method comprising:
using an open standard file system interface to instruct a storage gateway to create a directory having a directory name that includes a backup file name;
using the open standard file system interface to instruct the storage gateway to create a file for the directory, the file having a file name that includes the backup file name;
using the open standard file system interface to instruct the storage gateway to write information to the file, the information specifying how to store a backup file associated with the backup file name to cloud storage; and
using the open standard file system interface to instruct the storage gateway to store, based on the information written to the file, the backup file to cloud storage associated with the storage gateway.

9. The method of claim 8, wherein the method further comprises using the open standard file system interface to instruct the storage gateway to read a parameter associated with at least one of the information, the file, and the directory.

10. The method of claim 8, wherein instructing the storage gateway to store the backup file to the cloud storage comprises instructing the storage gateway to merge the backup file with data to another file in the directory.

11. The method of claim 8, wherein storing the backup file to the cloud storage comprises storing at least some of the information written to the file with the backup file.

12. The method of claim 8, wherein the method further comprises:
   using the open standard file system interface to instruct the storage gateway to remove the file; and
   using the open standard file system interface to instruct the storage gateway to remove the directory.

13. The method of claim 8, wherein the method further comprises:
   using the open standard file system interface to instruct the storage gateway to recreate the directory; and
   using the open standard file system interface to instruct the storage gateway to retrieve the data from the cloud storage.

14. The method of claim 8, wherein the method further comprises:
   using the open standard file system interface to instruct the storage gateway to open the directory; and
   using the open standard file system interface to instruct the storage gateway to retrieve the data from the cloud storage.

15. A computer program product, comprising a non-transitory computer-readable medium having a computer-readable program code embodied therein to be executed by one or more processors, the program code including instructions to:
   use an open standard file system interface to instruct a storage gateway to create a directory having a directory name that includes a backup file name;
   use the open standard file system interface to instruct the storage gateway to create a file for the directory, the file having a file name that includes the backup file name;
   use the open standard file system interface to instruct the storage gateway to write information to the file, the information specifying how to store a backup file associated with the backup file name to cloud storage; and
   use the open standard file system interface to instruct the storage gateway to store, based on the information written to the file, the backup file to cloud storage associated with the storage gateway.

16. The computer program product of claim 15, wherein the program code includes further instructions to use the open standard file system interface to instruct the storage gateway to read a parameter associated with at least one of the information, the file, and the directory.

17. The computer program product of claim 15, wherein instructing the storage gateway to store the backup file to the storage comprises instructing the storage gateway to merge the backup file with another file in the directory, and storing the backup file to the cloud storage comprises storing at least some of the information written to the file with the backup file.

18. The computer program product of claim 15, wherein the program code includes further instructions to:
   use the open standard file system interface to instruct the storage gateway to remove the file; and
   use the open standard file system interface to instruct the storage gateway to remove the directory.

19. The computer program product of claim 15, wherein the program code includes further instructions to:
   use the open standard file system interface to instruct the storage gateway to recreate the directory; and
   use the open standard file system interface to instruct the storage gateway to retrieve the data from the cloud storage.

20. The computer program product of claim 15, wherein the program code includes further instructions to:
   use the open standard file system interface to instruct the storage gateway to open the directory; and
   use the open standard file system interface to instruct the storage gateway to retrieve the data from the cloud storage.

* * * * *